(12) United States Patent
Penda et al.

(10) Patent No.: US 10,087,886 B2
(45) Date of Patent: Oct. 2, 2018

(54) TURBOFAN THRUST REVERSER SYSTEM

(71) Applicant: United Technologies Corporation, Hartford, CT (US)

(72) Inventors: Allan R. Penda, Amston, CT (US); Gabriel L. Suciu, Glastonbury, CT (US); William G. Sheridan, Southington, CT (US); Wesley K. Lord, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1161 days.

(21) Appl. No.: 14/284,893

(22) Filed: May 22, 2014

(65) Prior Publication Data

US 2015/0337762 A1 Nov. 26, 2015

(51) Int. Cl.

| F02K 1/70 | (2006.01) |
|---|---|
| F02C 7/36 | (2006.01) |
| F02K 1/32 | (2006.01) |
| F02K 3/075 | (2006.01) |
| F02C 3/10 | (2006.01) |
| F02C 3/113 | (2006.01) |
| F02C 3/14 | (2006.01) |
| F02C 6/04 | (2006.01) |
| F16H 3/60 | (2006.01) |

(52) U.S. Cl.
CPC ............... *F02K 1/70* (2013.01); *F02C 3/10* (2013.01); *F02C 3/113* (2013.01); *F02C 3/145* (2013.01); *F02C 6/04* (2013.01); *F02C 7/36* (2013.01); *F02K 1/32* (2013.01); *F02K 3/075* (2013.01); *F16H 3/60* (2013.01); *F05D 2260/40311* (2013.01); *Y02T 50/671* (2013.01)

(58) Field of Classification Search
CPC ... F02K 1/70; F02K 3/075; F02K 1/32; F02C 3/10; F02C 3/113; F02C 3/145; F02C 6/04; F02C 7/36; F16H 3/60; F05D 2260/40311
See application file for complete search history.

(56) References Cited

U.S. PATENT DOCUMENTS 2,648,998 A    8/1953 Stoeckicht
2,771,794 A *  11/1956 Shenk ................. F16H 3/60
                                              184/6.12

(Continued)

FOREIGN PATENT DOCUMENTS

DE    102010022933 A1    12/2011

OTHER PUBLICATIONS

European Patent Office, The partial European search report, dated Nov. 10, 2015, 5 pages.

*Primary Examiner* — Ted Kim
(74) *Attorney, Agent, or Firm* — Kinney & Lange, P.A.

(57) ABSTRACT

A gas turbine engine comprises a core engine, a fan, a bypass duct and a clutch. The fan is driven by the core engine. The bypass duct is configured to receive airflow from the fan. The clutch links the core engine and the fan. The core comprises a reverse-flow, two-spool gas generator in one embodiment. In another embodiment, the fan is driven by a free turbine aerodynamically powered by the core engine. In one embodiment, the clutch includes reverse gearing to reverse rotational output of the fan. In one embodiment, the clutch and reverse gearing are implemented in an epicyclic gear system.

7 Claims, 10 Drawing Sheets

(56) References Cited

U.S. PATENT DOCUMENTS

| | | | | |
|---|---|---|---|---|
| 3,429,202 | A | * | 2/1969 | Galicher ............... F16H 37/046 |
| | | | | 475/209 |
| 3,886,816 | A | * | 6/1975 | De Feo .................... F16H 3/60 |
| | | | | 475/139 |
| 4,005,575 | A | | 2/1977 | Scott et al. |
| 4,271,940 | A | | 6/1981 | Collin |
| 4,660,439 | A | | 4/1987 | Hiraiwa |
| 6,148,605 | A | | 11/2000 | Lardellier |
| 8,104,262 | B2 | | 1/2012 | Marshall |
| 8,109,467 | B2 | | 2/2012 | Murphy |
| 8,336,288 | B2 | * | 12/2012 | Venter ....................... F02C 9/18 |
| | | | | 60/226.1 |
| 8,459,038 | B1 | | 6/2013 | Lickfold et al. |
| 9,726,186 | B2 | * | 8/2017 | Masson ................... F04D 25/00 |
| 2003/0033798 | A1 | * | 2/2003 | Dickau ................... B64C 15/02 |
| | | | | 60/226.1 |
| 2003/0232692 | A1 | * | 12/2003 | Chen ........................ F16H 1/28 |
| | | | | 475/331 |
| 2010/0219779 | A1 | * | 9/2010 | Bradbrook .............. F02C 3/113 |
| | | | | 318/153 |
| 2011/0056208 | A1 | | 3/2011 | Norris et al. |
| 2013/0205752 | A1 | * | 8/2013 | Suciu ...................... F02K 3/025 |
| | | | | 60/226.1 |

* cited by examiner

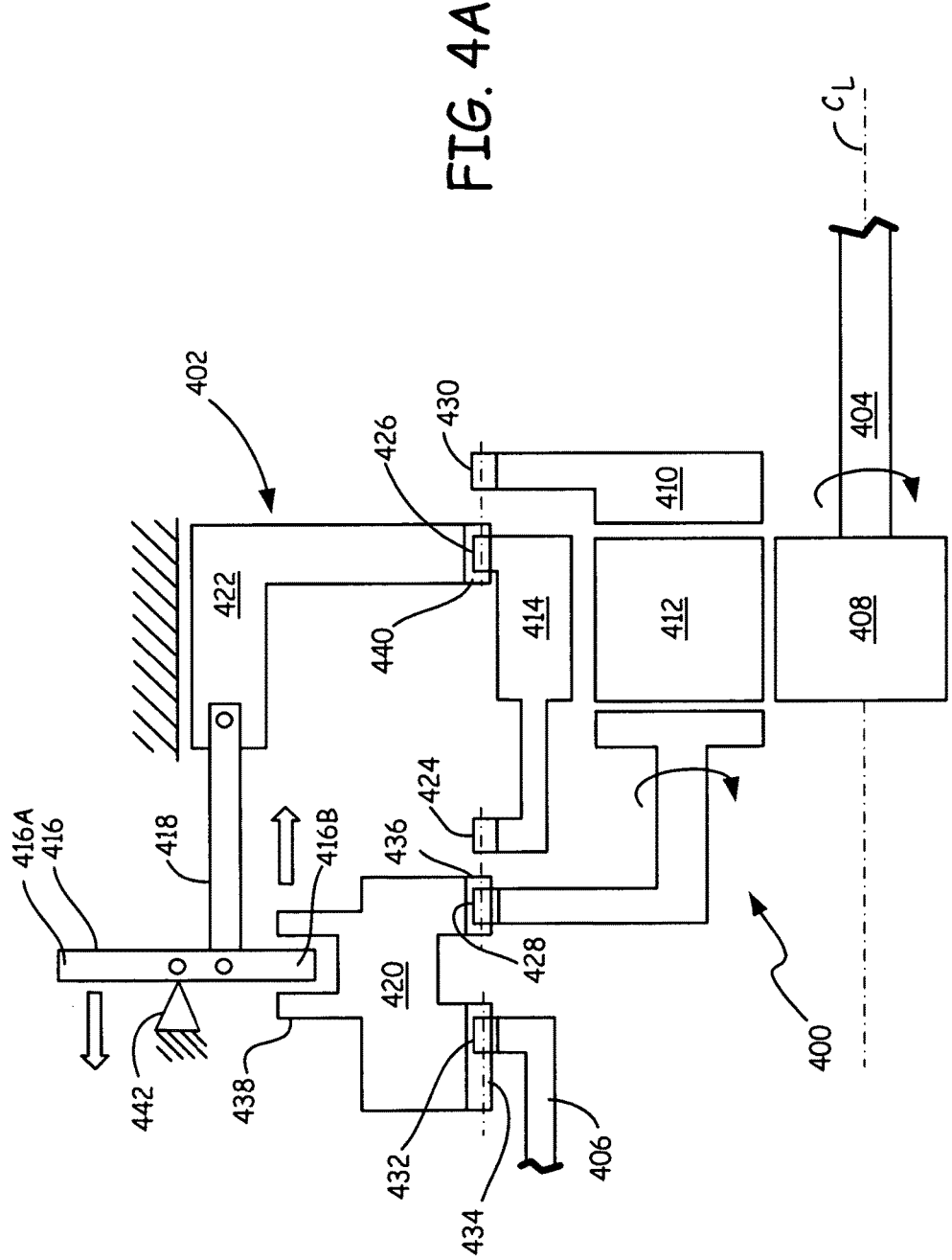

TURBOFAN THRUST REVERSER SYSTEM

BACKGROUND

The present disclosure is directed generally to thrust reversers for gas turbine engines. More specifically, the present disclosure is directed to systems for producing reverse thrust using a bypass turbofan.

Typical large bypass ratio turbofan engines utilize thrust reversers to assist aircraft in reducing speed during landing operations. Conventional thrust reversers involve interrupting the flow of bypass air generated by the turbofan with a blocker door, and rerouting the flow of that air in a forward direction to counteract forward speed of the aircraft. One such blocker door thrust reversal system is described in U.S. Pat. No. 8,109,467, which is assigned to United Technologies Corporation. Blocker door systems, however, can add upwards of 1,000 pounds (~453.6 kg) of weight to the aircraft. Other attempts of reversing the direction of airflow generated by the fan have involved reversing the rotation of the fan itself using a clutch. One such clutch thrust reversal system is described in U.S. Pat. No. 6,148,605, which is assigned to Societe Nationale d'Etude et de Construction de Moteurs d'Aviation. However, reversing the rotational direction of the fan itself has been difficult to achieve due to the inertia of the fan system and complexity of the mechanism required to complete the reversal. There is, therefore, a need for a feasible, lightweight thrust reversal system for turbofan engines.

SUMMARY

A gas turbine engine comprises a core engine, a fan, a bypass duct and a clutch. The fan is driven by the core engine. The bypass duct is configured to receive airflow from the fan. The clutch links the core engine and the fan. The core comprises a reverse-flow, two-spool gas generator in one embodiment. In another embodiment, the fan is driven by a free turbine aerodynamically powered by the core engine. In one embodiment, the clutch includes reverse gearing to reverse rotational output of the fan. In one embodiment, the clutch and reverse gearing are implemented in an epicyclic gear system.

BRIEF DESCRIPTION OF THE DRAWINGS

FIG. 4A is a schematic view of an epicyclic gear system having a clutch actuated so the epicyclic gear system operates as a planetary gear system with positive rotational output.

DETAILED DESCRIPTION

Figure 1A:
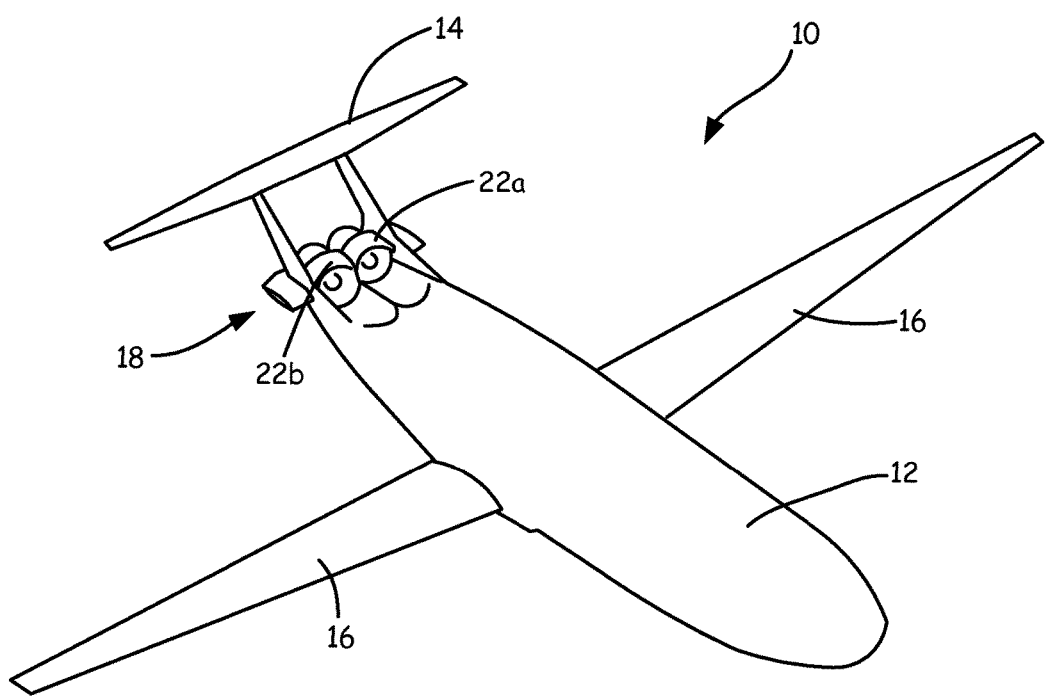
FIG. 1A is a schematic view of an aircraft including a propulsion system mounted within the fuselage.
Figure 1B:
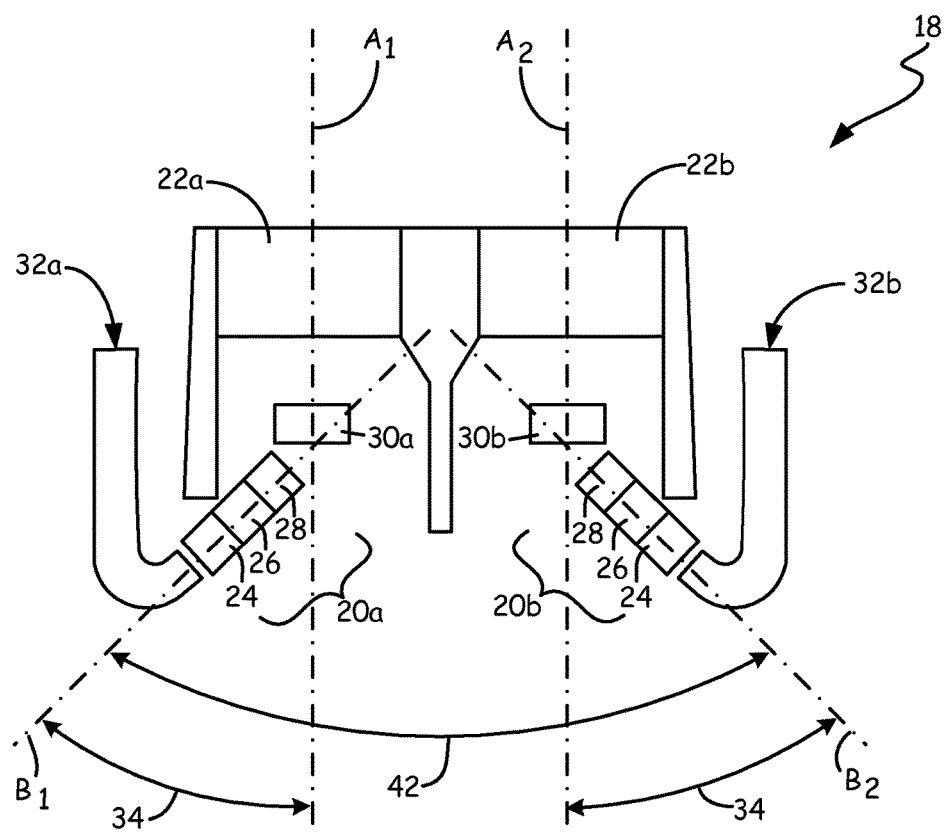
FIG. 1B is a schematic view of the example propulsion system.

As shown in FIGS. 1A and 1B, aircraft 10 includes fuselage 12 having wings 16 and tail 14. Propulsion system 18 is mounted aft end of fuselage 12. Propulsion system 18 includes first and second engine cores 20a-20b, which are reverse core gas turbine engines, that drive corresponding first and second propulsors, that include respective fan sections 22a-22b. First and second fan sections 22a-22b provide the propulsive thrust of the disclosed propulsion system.

Each of fan sections 22a-22b are disposed about corresponding first and second propulsor axis A1 and A2. First and second engine cores 20a-20b are disposed about corresponding first and second engine axes B1 and B2. First engine core 20a is disposed about first engine axis B1 and drives the first propulsor about first propulsor axis A1. Second engine core 20b is disposed about second engine axis B2 and drives second fan section 20b about second propulsor axis A2.

The illustrated reverse engine cores 20a-20b are gas generators that include compressor 24, combustor 26 and turbine 28. Air is drawn in through inlets 32a-32b to compressor 24 and is compressed and communicated to combustor 26. In combustor 26, air is mixed with fuel and ignited to generate an exhaust gas stream that expands through turbine 28 where energy is extracted and utilized to drive compressor 24 and corresponding fan 22a-22b. In this example, engine cores 20a-20b drive corresponding fan 22a-22b through geared architecture 30a-30b, which is also considered part of the respective propulsor.

In the disclosed example, each of first and second fans 22a-22b and related gearing 30a-30b is mounted substantially parallel to each other about respective propulsor axes A1, A2. First and second engine axes B1, B2 are disposed at angle 34 relative to corresponding propulsor axis A1, A2. In this example, angle 34 is greater than about thirty (30) degrees. As appreciated other angles are within the contemplation of this disclosure.

Figure 1C:
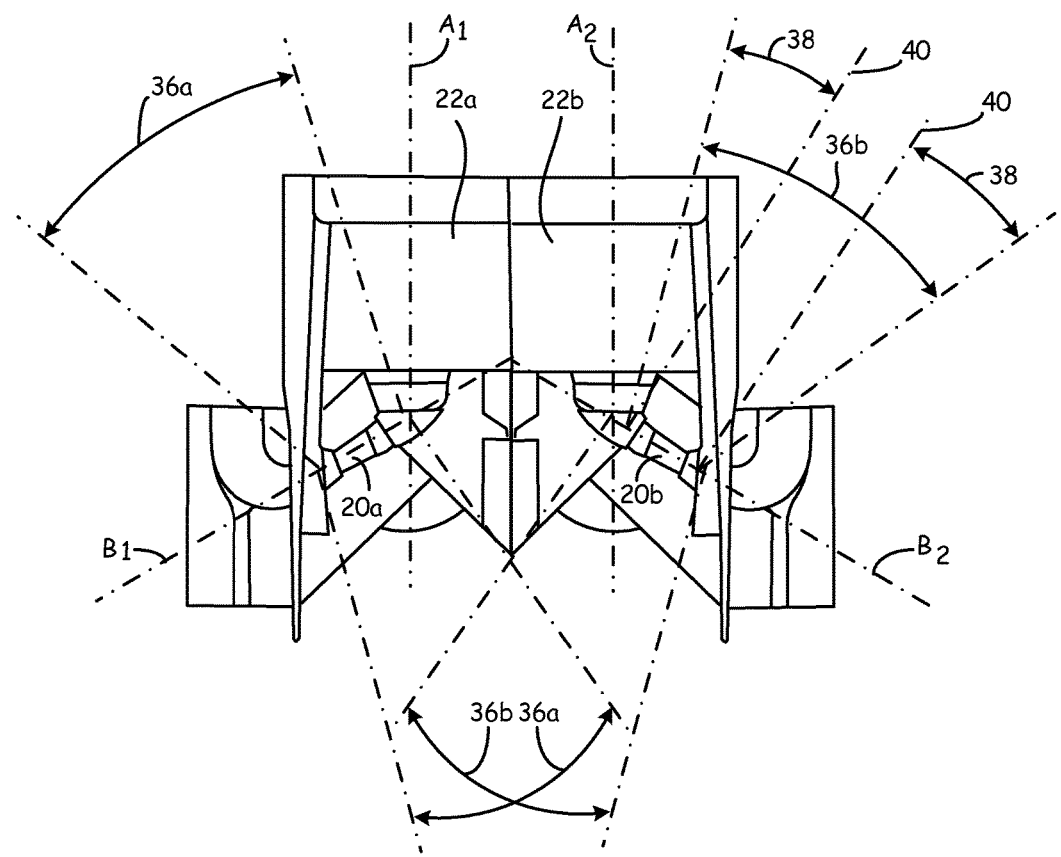
FIG. 1C is a schematic view of a burst zone defined about the example propulsion system.

Referring to FIG. 1C, with continued reference to FIG. 1B, gas turbine engines are not typically mounted next to each other due to practical limitations related to overall aircraft survivability in the event of engine failure. A burst zone is defined between gas turbine engines within which another gas turbine engine is not permitted due to possible fragmentation from one failed engine disabling the second engine.

Engine cores 20a-20b are disposed at angle 34 relative to the corresponding propulsor axes A1 and A2 and to each other such that neither engine core 20a-20b is disposed within burst zone 36a-36b of the other engine core 20a-20b. In other words, each of engine cores 20a-20b is disposed at an angle away from the other engine core 20a-20b such that each is orientated outside of the other's bust zone 36a-36b. In this example, engine cores 20a-20b are angled away from each other at angle 42 (FIG. 1B). In this example, angle 42 is greater than about ninety (90) degrees. As appreciated other angles 42 could be utilized depending on the definition of respective burst zones 36a-36b.

The respective bust zones 36a-36b are defined as respective annular regions about corresponding engine core 20a-20b. In this example, the annular region is disposed at angle 38 outward from line 40 perpendicular to engine axis B1, B2. The example angle is at least fifteen (15) degrees and is determined based on application specific considerations. Moreover, airframe regulations may also define an angular span of burst zones 36a-36b and thereby angle 38.

The relative orientation between first and second engine cores 20a-20b defines the corresponding burst zones 36a-36b that does not interfere with the other engine core 20a-20b to comply with application specific survivability requirements.

Accordingly, because the gas generators are mounted in a configuration placing each outside of the other's burst zone, fuselage and substantially adjacent mounted propulsors are feasible within desired limitations. The side by side adjacent mounting configuration further enables alternate aircraft architectures.

Figure 2A:
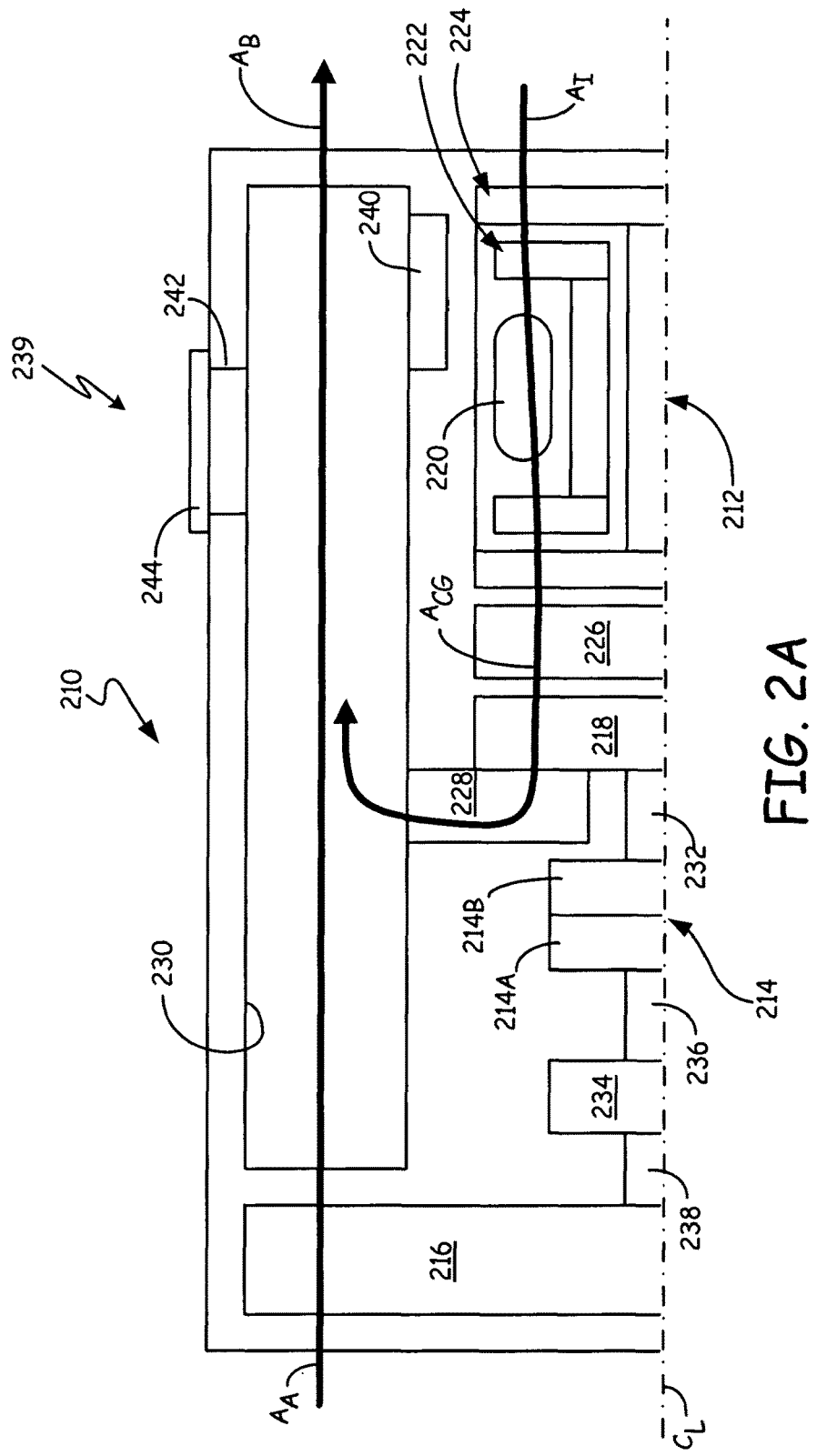
FIG. 2A is a schematic view of a turbofan engine comprising a two-spool, reverse flow core, and a clutch coupling a fan and a power turbine driven by the core.

FIG. 2A is a schematic view of turbofan engine 210 comprising two-spool, reverse flow core 212, and clutch 214 coupling fan 216 and free turbine 218. Core 212 includes combustor 220, high pressure spool 222 and low pressure spool 224. Transition duct 226 fluidly couples core 212 with free turbine 218. Vent duct 228 fluidly couples to free turbine 218 and bypass duct 230. Free turbine 218 mechanically drives clutch 214 via drive shaft 232. Clutch 214 is schematically shown as a friction clutch having disks 214A and 214B, although other types of clutches may be used. Clutch 214 drives gear system 234 through flex coupling 236, and gear system 234 provides input to fan 216 through fan shaft 238. Bypass duct 230 includes thrust reverser 239, which comprises blocker door 240, vent 242 and cowl 244. Turbofan engine 210 is concentrically disposed about engine centerline CL. As will be discussed later, inlet air $A_I$ passes through core 212 and is converted to combustion gases $A_{CG}$. Ambient air $A_A$ enters bypass duct 230 and is driven by fan 216 to exit bypass duct as bypass air $A_B$.

Core 212 is disposed in a case structure wherein inlet air $A_I$ is drawn in at the aft end of core 212 and pushed forward to transition duct 226 at the forward end. In other embodiments, core 212 may be fed with bypass air $A_B$ via a diffuser duct connecting core 212 to bypass duct 230 at the aft end of turbofan engine 210. Core 212 operates using known Brayton cycle principles to convert ambient air $A_A$ into combustion gases $A_{CG}$. Specifically, combustor 220 burns fuel and air pressurized within low spool 222 and high spool 224 to generate combustion gases $A_{CG}$. Low spool 222 and high spool 224 each comprise a compressor stage that is driven by a turbine stage through a shaft. Each turbine stage is driven with combustion gases $A_{CG}$ generated by combustor 220. Core 212 is described as a two-spool, or dual-spool, core because its main function within turbofan engine 210 is to produce gases for driving free turbine 218, in addition to driving turbines of spools 222 and 224. In other words, core 212 does not produce any, or nearly any, direct propulsive thrust within turbofan engine 210. Core 212 is also described as being a reverse flow engine because airflow through core 212 is opposite the direction of motion of engine 210 and airflow through bypass duct 230.

After passing through transition duct 226, combustion gases $A_{CG}$ flow through free turbine 218, causing rotation of drive shaft 232, and pass into vent duct 228. Vent duct 228 empties combustion gases $A_{CG}$ into bypass duct 230 for joining with bypass air $A_B$. In one embodiment, vent duct 228 connects to hollow fan exit guide vanes within bypass duct 230. Rotation of drive shaft 232 causes rotation of flex coupling 236 when clutch 214 is engaged, as depicted in FIG. 2A. Flex coupling 236 causes rotation of epicyclic gear system 234, which reduces the speed of fan shaft 238 relative to flex coupling 236. Fan 216 is thus driven at a speed suited for generating bypass air $A_B$, so called for bypassing core 212. Bypass air $A_B$ generates all, or substantially all, of the propulsive thrust of turbofan engine 210.

FIG. 2A depicts turbofan engine 210 during normal operations, such as during take-off and cruise of an aircraft to which it can be attached, when it is desirable to produce forward propulsive thrust. As such, thrust reverser 239 is in a retracted or stowed state. Specifically, blocker door 242 is withdrawn into bypass duct 230 so as to not obstruct flow of bypass air $A_B$ through bypass duct 230. Additionally, cowl 244 is positioned over vent 242 to prevent any of bypass air $A_B$ from passing through vent 242. As such, turbofan engine 210 produces forward propulsive thrust by pushing of bypass air $A_B$ through bypass duct with fan 216.

It is, however, sometimes desirable to prevent turbofan engine 210 from producing thrust and to even generate aftward propulsive thrust. For example, during landing operations it is desirable to generate aftward propulsive thrust, typically after the aircraft has touched down on the runway. In such scenarios, clutch 214 disengages and thrust reverser 239 is deployed, as is explained with reference to FIG. 1B.

Figure 2B:
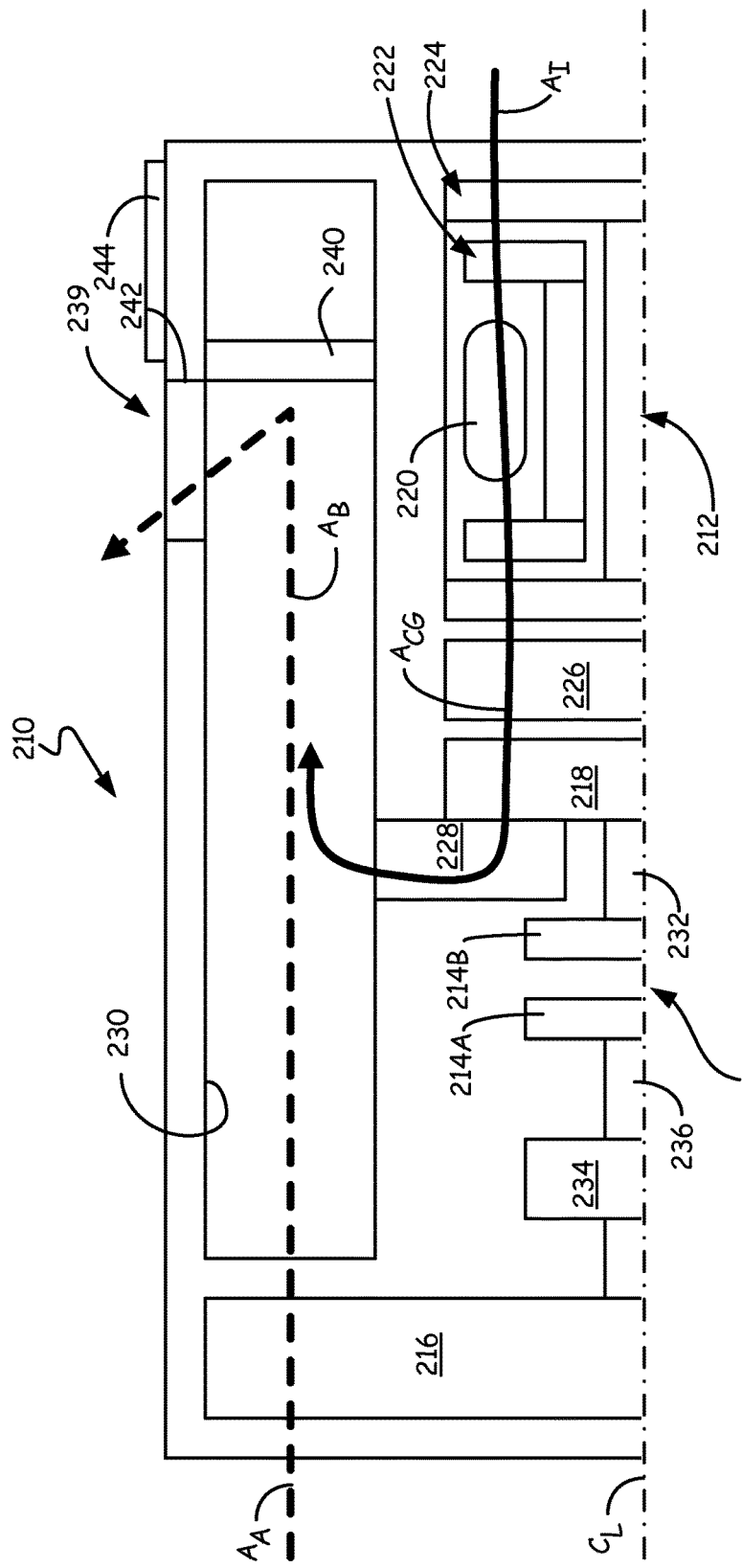
FIG. 2B is a schematic view of the turbofan engine of FIG. 2A with the clutch disengaged and a blocker door thrust reverser in a deployed state.

FIG. 2B is a schematic view of turbofan engine 210 of FIG. 2A with clutch 214 disengaged and thrust reverser 239 in a deployed state. FIG. 2B includes all of the same elements as FIG. 2A, which are labeled with the same reference numerals. In FIG. 2B, blocker door 240 is positioned, e.g. rotated, to obstruct flow of bypass air $A_B$ through bypass duct 230. Simultaneously, cowl 244 is positioned, e.g. retracted, to allow airflow through vent 242. Vent 242 includes vanes or louvers that are curved to direct bypass air forward at it passes through vent 242, thereby generating aftward propulsive thrust. Blocker door 240 and cowl 244 may be positioned via any actuation system that is known in the art.

Simultaneously with or before deployment of thrust reverser 239, clutch 214 disengages to cut power to fan 216. In the embodiment shown, disks 214A and 214B disengage to allow fan 216 to rotate independently of free turbine 218. However, in other embodiments, clutch 214 may comprise other types of clutches, such as wet clutches, cone clutches or centrifugal clutches. With clutch 214 disengaged, fan 216 is no longer powered by free turbine 218 and, therefore, does not actively produce thrust via acceleration of bypass air $A_B$. However, fan 216 produces residual thrust by the momentum of fan 216 and wind-milling effect. Bypass air $A_B$ generated by these forces, however, is used with thrust reverser 239 to produce aftward propulsive thrust that assists in slowing the velocity of the aircraft in which turbofan engine 210 is used. Furthermore, by cutting power to fan 216, the airfoils of fan 216 generate drag as turbofan engine 210 moves, which further assists in slowing the velocity of the aircraft to which turbofan engine 210 is mounted.

With fan 216 uncoupled from free turbine 216, the speed of the aircraft is reduced by three factors: 1) ceasing active production of forward propulsive thrust, 2) drag of fan 216, and 3) aftward propulsive thrust from thrust reverser 239. Because of factors 1) and 2), the capacity of factor 3) can be reduced. Specifically, the size, e.g. axial length, of thrust reverser 239 can be reduced as compared to conventional thrust reverser systems used in conventional turbofan engines. Thus, the weight of thrust reverser 239 can be reduced, thereby increasing the overall efficiency and effectiveness of turbofan engine 210.

Figure 3A:
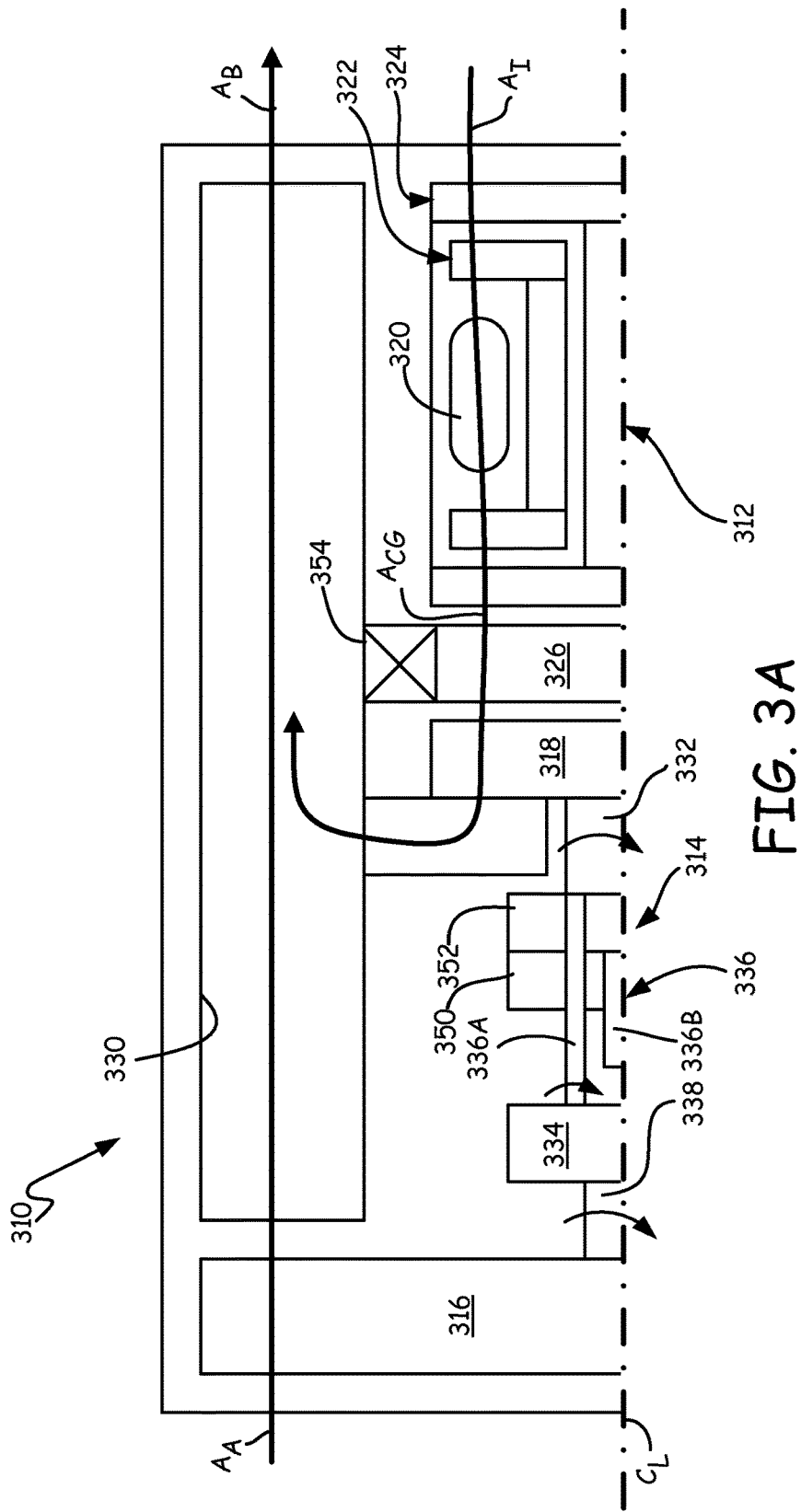
FIG. 3A is a schematic view of a turbofan engine comprising a two-spool, reverse flow core, and a reversing clutch coupling a fan and a power turbine driven by the core.

FIG. 3A is a schematic view of turbofan engine 310 comprising two-spool, reverse flow core 312, and reversing clutch 314 coupling fan 316 and power turbine 318. Core 312 includes combustor 320, high pressure spool 322 and low pressure spool 324. Transition duct 326 fluidly couples core 312 with free turbine 318. Vent duct 328 fluidly couples to free turbine 318 and bypass duct 330. Free turbine 318 mechanically drives clutch 314 via drive shaft 332. Reversing clutch 314 is schematically shown comprising clutch mechanism 350 and gearbox 352. Reversing clutch 314 drives gear system 334 through flex coupling 336, which includes outer shaft 336A and inner shaft 336B. Gear system 334 provides input to fan 316 through fan shaft 338. Turbofan engine 310 is concentrically disposed about engine centerline CL. As will be discussed later, inlet air $A_I$ passes through core 312 and is converted to combustion gases $A_{CG}$. Ambient air $A_A$ enters bypass duct 330 and is driven by fan 316 to exit bypass duct as bypass air $A_B$. Bypass duct 330 is fluidly coupled to transition duct 326 via valve 354.

During normal operation of turbofan engine 310, such as during take-off and cruise of an aircraft to which it can be attached, valve 354 is closed and clutch 314 is positioned such that drive shaft 332 is directly coupled to gear system 334 via outer shaft 336A, disengaging operation of gearbox 352, as depicted in FIG. 3A. Core 312 operates the same as core 112 of FIG. 2A. Thus, combustion gases $A_{CG}$ pass through transition duct 326, due to valve 354 being closed, to power free turbine 318. Vent duct 328 exhausts combustion gases $A_{CG}$ to bypass duct 330. Rotation of free turbine 318 causes drive shaft 332 to rotate in the same direction. Clutch 314 is positioned such that clutch mechanism 350 disengages inner shaft 336B and gear box 352 from gear system 334, and engages outer shaft 336A with gear system 334. Reversing clutch 314 may comprise any reversing clutch system as is known in the art. For example, reversing clutch 314 may be configured similarly to reversing clutches known in the marine propulsion or automotive industries. In one embodiment, reversing clutch 314 is configured similarly to a marine propulsion clutch described in U.S. Pat. No. 4,271,940 to Collin. Fan shaft 338 is coupled to gear system 334 so as to rotate under input from outer shaft 336A or inner shaft 336B. In the described embodiment, gear system 134 comprises an epicyclic gear system configured as a planetary system such that fan shaft 138 rotates in the same direction as drive shaft 332, but at a reduced rate of speed. Specifically, operation of core 312 produces clockwise rotation of power turbine 318 (as viewed from the forward end of turbofan engine 310), which produces clockwise rotation of outer shaft 336A and fan shaft 338. Under power from fan shaft 338, fan 316 rotates to generate bypass air $A_B$ within bypass duct 330, thereby generating forward propulsive thrust.

It is, however, sometimes desirable to prevent turbofan engine 310 from producing thrust and to even generate aftward propulsive thrust. For example, during landing operations it is desirable to generate aftward propulsive thrust, typically after the aircraft has touched down on the runway. In such scenarios, reversing clutch 314 is employed to reverse the rotational direction of fan 316 in order to produce aftward propulsive thrust, as is explained with reference to FIGS. 3B and 3C.

Figure 3B:
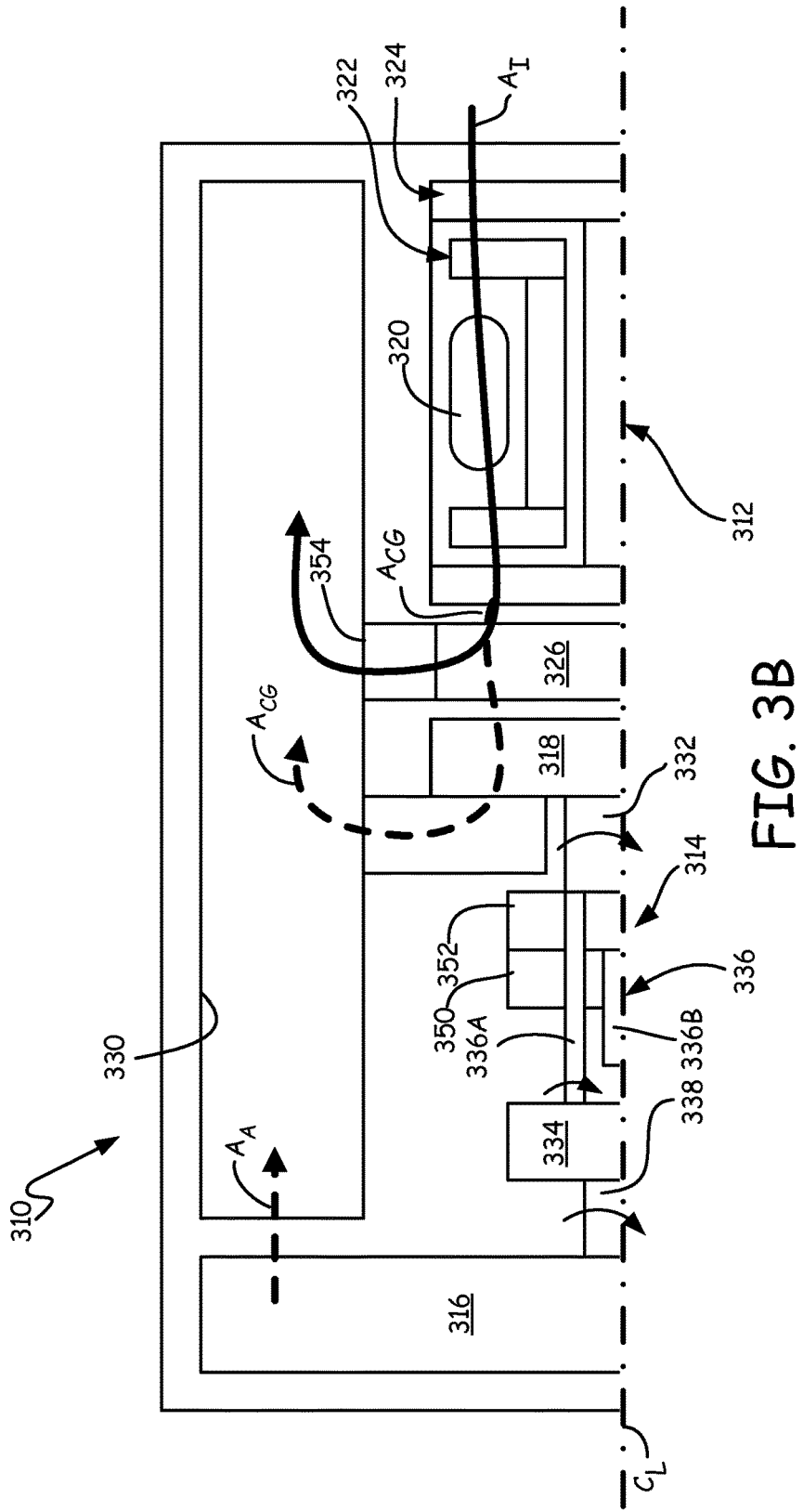
FIG. 3B is a schematic view of the turbofan engine of FIG. 3A with the reversing clutch coupling the fan to the power turbine, and a valve venting the power turbine to a bypass duct.

FIG. 3B is a schematic view of turbofan engine 110 of FIG. 3A with reversing clutch 314 coupling fan 316 to power turbine 318, and valve 354 venting power turbine 318 to bypass duct 330. FIG. 3B includes all of the same elements as FIG. 3A, which are labeled with the same reference numerals. In FIG. 3B, valve 354 is opened to permit transition duct 326 to vent to bypass duct 330. As such, the majority of combustion gases $A_{CG}$ pass through to bypass duct 330 after being generated in core 312. Not all combustion gases $A_{CG}$, however, pass through valve 354 such that free turbine 318 is lightly loaded, as indicated in FIG. 3B by a broken arrow for combustion gases $A_{CG}$. The lightly powered rotation of free turbine 318 produces lightly powered rotation of fan 316, which produces a mild amount of forward propulsive thrust, indicated by a broken arrow for bypass air $A_B$, as compared to that of FIG. 3A.

Opening of valve 354 substantially unloads free turbine 318 so that reversing clutch 314 can be engaged to reverse rotation of fan shaft 338. Specifically, reversing clutch can be repositioned to change from coupling of outer shaft 336A with gear system 334, to coupling of inner shaft 336B with gear system 334. During a landing operation, after touch down, core 312 can be reduced to idle power such that free turbine 318 becomes unloaded. Because free turbine 318 is unloaded, reversing clutch 314 does not have to withstand the full brunt of forces generated by core 312. In other embodiments, clutch 314 may include a braking and speed matching mechanism, such as a synchromesh, that matches the speed of drive shaft 332 with flex coupling 336 before reengaging with gear system 334. Thus, production of forward propulsive thrush, as depicted in FIG. 3A, can be readily transitioned to aftward propulsive thrust, as depicted in FIG. 3C.

Figure 3C:
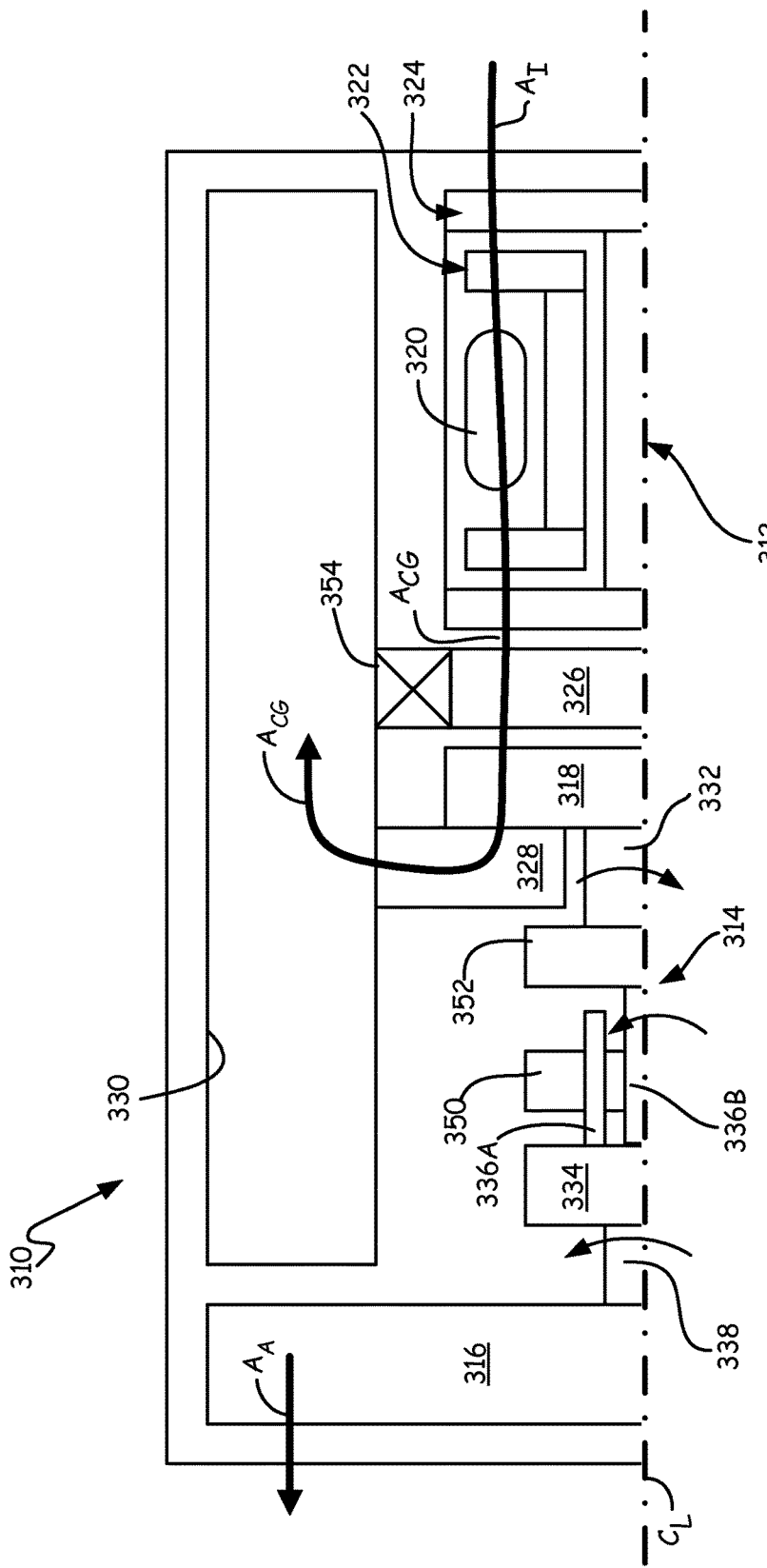
FIG. 3C is a schematic view of the turbofan engine of FIG. 3B with the reversing clutch coupling the fan to the power turbine in a reverse direction.

FIG. 3C is a schematic view of turbofan engine 310 of FIG. 3B with reversing clutch 314 coupling fan 316 to power turbine 318 in a reverse direction. FIG. 3C includes all of the same elements as FIG. 3B, which are labeled with the same reference numerals. In FIG. 3C, valve 354 is closed, and reversing clutch 314 is engaged to connect inner shaft 336B to gear system 334 and gearbox 352, while disconnecting outer shaft 336A from drive shaft 332. Core 312 and power turbine 318 operate similarly as to what is described with reference to FIG. 3A. For example, operation of core 312 produces clockwise rotation of power turbine 318 (as viewed from the forward end of turbofan engine 310). However, reversing clutch 314 is now configured to produce opposite, or negative, rotation of inner shaft 336B. Specifically, reversing clutch 314 produces counter-clockwise rotation of inner shaft 336B from clockwise rotation of drive shaft 332.

With drive shaft 332, fan shaft 338 and fan 316 rotating in a negative direction, fan 116 no longer produces forward propulsive thrust with bypass air $A_B$. Instead, fan 316 produces aftward propulsive thrust that tends to reduce the velocity of an aircraft attached to turbofan engine 310. Thus, the speed of the aircraft can be more rapidly reduced as compared to an aircraft with a conventional, blocker door thrust reversal system without a clutch. In particular, fan 316 can be rotated under power of core 312 to produce a full load of aftward propulsive thrust, thereby greatly decelerating the aircraft. Thus, the aircraft can be stopped on much shorter runways. Furthermore, thrust reversal systems can be eliminated from turbofan engine 310 altogether, thereby greatly reducing weight.

FIG. 4A is a schematic view of epicyclic gear system 400 having clutch mechanism 402 actuated so epicyclic gear system 400 operates as a planetary gear system with positive rotational output. Actuated as such, input shaft 404 and output shaft 406 rotate in the same direction. Epicyclic gear system 400 includes sun gear 408, carrier 410, spur gears 412 (only one of which is shown in FIG. 4A) and ring gear 414. Clutch mechanism 402 includes lever 416, linkage 418, spline collar 420 and spline ring 422. Ring gear 414 includes first radial spline 424 and second radial spline 426. Carrier 410 includes third radial spline 428 and fourth radial spline 430. Output shaft 406 includes fifth radial spline 432. Spline collar 420 includes output spline 434, input spline 436 and channel 438. Spline ring 422 includes ground spline 440.

Lever 416 is grounded at fulcrum 442, which may be located on a stationary component of a gas turbine engine, such as turbofan engine 310 of FIG. 3A. Lever 416 extends across fulcrum 416 from first end 416A to second end 416B. First end 416A can be coupled to an actuation system that can displace first end 416A across an arc, thereby moving second end 416B oppositely. Second end 416B is disposed in channel 238 of spline collar 420. Spline collar 420 is configured to rotate circumferentially about centerline CL. Second end 416B of lever 416 rides in channel 438 as spline collar 420 rotates. Lever 416 is actuated to displace spline collar 420 axially along centerline CL.

Linkage 418 extends from lever 416 to spline ring 422. Linkage 418 is pivotably connected, such as through pinned connections, to both lever 416 and spline ring 422. Spline ring 422 is grounded within turbofan engine 310. Specifically, spline ring 422 is prevented from rotating circumferentially about centerline CL (e.g. in and out of the plane of FIG. 4A), but is permitted to move axially along centerline CL (left and right in the plane of FIG. 4A). Spline ring 422 can thus be anchored to turbofan engine 310 at a spline connection. Lever 416 is actuated to displace spline ring 422 axially along centerline CL.

Figure 4B:
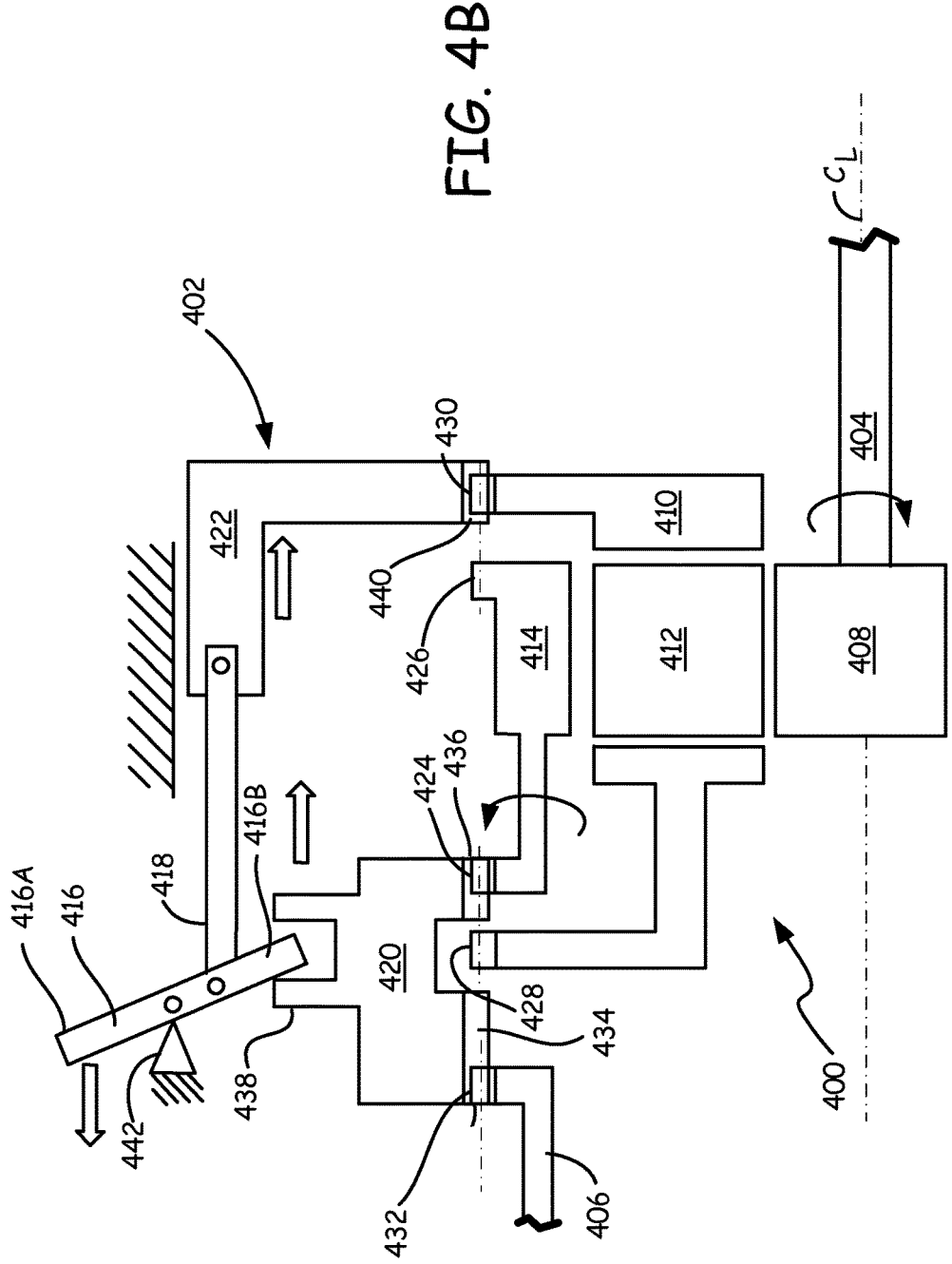
FIG. 4B is a schematic view of the epicyclic gear system of FIG. 4A with the clutch actuated so the epicyclic gear system operates as a star gear system with negative rotational output.

Lever 416 is pivoted about fulcrum 442 to advance or retreat spline collar 420 and spline ring 422, thereby switching engagement of the two between carrier 410 and ring gear 414. In the configuration of FIG. 4A, spline collar engages carrier 410 and spline ring engages ring gear 414. In the configuration of FIG. 4B, spline collar engages ring gear 414 and spline ring engages carrier 410.

Ground spline 440 extends from spline ring 422 toward second radial spline 426 of ring gear 414, and fourth radial spline 430 of carrier 410. Ground spline 440 is only wide enough to span one of fourth radial spline 430 or second radial spline 426. Specifically, ground spline 440 can only be engaged with one of fourth radial spline 430 and second radial spline 426, depending on the position of lever 416.

Input spline 436 extends from spline collar 220 toward third radial spline 428 of carrier 410, and first radial spline 424 of ring gear 414. Input spline 436 is only wide enough to span one of third radial spline 428 and first radial spline 424. Specifically, input spline 436 can only be engaged with one of third radial spline 428 and first radial spline 424, depending on the position of lever 416.

Output spline 434 extends from spline collar 420 toward fifth radial spline 432 of output shaft 406. Output spline 434 is wide enough to engage fifth radial spline 432 no matter the position of lever 416.

In the configuration of FIG. 4A, ground spline 440 of spline ring 422 extends to mesh with second radial spline 426 of ring gear 414. As such, ring gear 414 is anchored within turbofan engine 310 so as to not rotate circumferentially about centerline CL. Simultaneously, input spline 436 of spline collar 420 extends to mesh with third radial spline 428 of carrier 410. As such, carrier 410 is coupled to output shaft 406 through spline collar 420 so as to be able to rotate about centerline CL.

Clutch mechanism 402 is positioned such that epicyclic gear system 400 operates as a planet gear system. Input shaft 404 and sun gear 408 rotate clockwise (as viewed from the forward end of epicyclic gear system 400). Spur gears 412 thus roll about sun gear 408 in a counter-clockwise direction, orbiting sun gear 408 in the process. This causes carrier 410 to rotate in a clockwise direction about centerline CL at a slower rate than that of sun gear 408. Thus, spline collar 420 also rotates in a clockwise direction through engagement of third radial spline 428 and input spline 436, driving output shaft 406 in a clockwise direction through engagement of fifth radial spline 432 and output spline 434.

In one embodiment, input shaft 404 comprises drive shaft 332 of FIG. 3A, and output shaft 406 comprises fan shaft 338 of FIG. 3A. In such an embodiment, epicyclic gear system 400, including clutch mechanism 402, replaces reversing clutch 314 and gear system 334 of FIG. 3A. Thus, output shaft 406 drives a fan stage of a turbofan engine, thereby producing bypass air that generates forward propulsive thrust used for take-off, cruise and other maneuvers of an aircraft. It is sometimes desirable, such as during a landing maneuvers, to generate aftward propulsive thrust to slow the velocity of the aircraft on a runway.

FIG. 4B is a schematic view of epicyclic gear system 400 of FIG. 4A with clutch mechanism 402 actuated so epicyclic gear system 400 operates as a star gear system with negative rotational output. Actuated as such, input shaft 404 and output shaft 406 rotate in opposite directions. FIG. 4B includes all of the same elements as FIG. 4A, which are labeled with the same reference numerals. In FIG. 4B, clutch mechanism 202 is actuated to advance first end 416A of lever 416 in the upstream direction (relative to the direction of airflow through the fan 316 of FIG. 3A, for example), such as by an actuation mechanism that is cockpit controlled or controlled by a FADEC. Actuated as such, spline collar 420 retreats in the downstream direction to engage first radial spline 424 of ring gear 414, and spline ring 422 retreats in the downstream direction to engage fourth radial spline 430 of carrier 410. Ring gear 414 thereby becomes rotatably engaged with spline collar 420, and carrier 410 become grounded by spline ring 422.

Clutch mechanism 402 is positioned such that epicyclic gear system 400 operates as a star gear system. Input shaft 404 and sun gear 408 rotate clockwise (as viewed from the forward end of epicyclic gear system 400). Spur gears 412 thus roll in-place about sun gear 208 in a counter-clockwise direction because carrier 410 is held stationary about centerline CL by spline ring 422. Rolling of spur gears 412 causes ring gear 414 to rotate in a counter-clockwise direction about centerline CL at a slower rate than that of sun gear 408. Thus, spline collar 420 also rotates in a counter-clockwise direction through engagement of first radial spline 424 and input spline 436, driving output shaft 406 in a counter-clockwise direction through engagement of fifth radial spline 432 and output spline 434. Thus, output shaft 406 drives a fan stage of a turbofan engine in reverse, thereby producing bypass air that generates aftward propulsive thrust used for landing operations of an aircraft.

Implementation of epicyclic gear system 400 and clutch system 402 eliminates the need for additional reverse gearing, clutches and the like, to reverse rotation of an engine, such as turbofan engine 310 of FIG. 3A. Epicyclic gear system 400 and clutch system 402 thereby reduce cost and complexity of thrust reversing systems. Furthermore, epicyclic gear system 400 and clutch system 402 eliminate the need for separate thrust reversing systems, such as blocker doors, vents and cowlings, that add large amounts of undesirable weight to the engine and aircraft.

Although the present invention has been described with reference to preferred embodiments, workers skilled in the art will recognize that changes may be made in form and detail without departing from the spirit and scope of the invention.

The invention claimed is:

1. A gas turbine engine comprising:
   a core engine;
   a fan driven by the core engine;
   a bypass duct configured to receive airflow from the fan;
   a clutch linking the core engine and the fan; and
   an epicyclic gear system coupling the clutch to the fan, the epicyclic gear system comprising:
      a sun gear disposed at a center of the system;
      a carrier concentrically surrounding the sun gear;
      spur gears disposed within the carrier and engaged with the sun gear; and
      a ring gear concentrically surrounding the carrier and engaged with the spur gears;
   wherein the clutch comprises:
      a spline collar configured to rotate with the ring gear or the carrier;
      a spline ring anchored to ground; and
      an actuator coupled to the spline collar and the spline ring, the actuator comprising:
         a grounded lever coupled to the spline collar; and
         a linkage connecting the lever and the spline ring; and
   wherein the clutch switches the epicyclic gear between operating as a planet gear system and a star gear system by alternatively grounding the ring gear or the carrier.

2. The gas turbine engine of claim 1, wherein the core engine comprises a two-spool reverse flow core, and wherein the two-spool reverse flow core exhausts to the bypass duct.

3. The gas turbine engine of claim 2 and further comprising:
   a free turbine disposed between the core engine and the fan such that the free turbine is powered by the core engine and the clutch links the fan and the free turbine.

4. The gas turbine engine of claim 3 and further comprising:
   a valve fluidly coupling the free turbine to the bypass duct.

5. The gas turbine engine of claim 3 and further comprising:
   a vent duct fluidly coupling output of the free turbine with the bypass duct;
   a transition duct fluidly coupling the free turbine and the core engine; and
   a valve fluidly coupling the bypass duct and the transition duct.

6. The gas turbine engine of claim 1, wherein the clutch reverses rotational output direction of the epicyclic gear system.

7. The gas turbine engine of claim 1 and further comprising an output shaft coupled to the clutch, wherein the clutch alternatively couples the output shaft to the ring gear or to the carrier.

* * * * *